Sept. 12, 1950 T. E. WRIGHT 2,522,330
COUNTERSINKING TOOL
Filed April 16, 1947

T. E. Wright
INVENTOR

BY Ca Knowles.
ATTORNEYS.

Patented Sept. 12, 1950

2,522,330

UNITED STATES PATENT OFFICE 2,522,330

COUNTERSINKING TOOL

Thomas Eugene Wright, Belleville, N. J.

Application April 16, 1947, Serial No. 741,875

1 Claim. (Cl. 77—73.5)

This invention relates to countersinking tools, and more especially, to a device for holding the tool adjustably, so as to limit the depth of the cut produced thereby without scarring or otherwise defacing the surface adjacent to the opening or recess produced by the tool.

A further object is to provide a device of this character the use of which insures accurate duplication of countersinks so that after the parts once are set, any desired number of countersinks can be produced, all of which will be of the same size and proportions.

Another object is to provide a device of the class stated which constitutes an antifriction collar or guide for the countersinking tool of the conventional style, the entire structure being simple and inexpensive in construction and, in addition thereto, insuring extreme accuracy both as to the depth and shape of the holes produced.

Another object is to provide a structure which is designed to permit the free escape of chips during the reaming or countersinking operation.

A further important object of the invention is to provide a countersinking tool in which the countersink held thereby can be adjusted longitudinally, and efficiently and accurately retained in its position of adjustment, by novel means not requiring removal of the tool from the chuck in which it is locked.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings.

Figure 1:
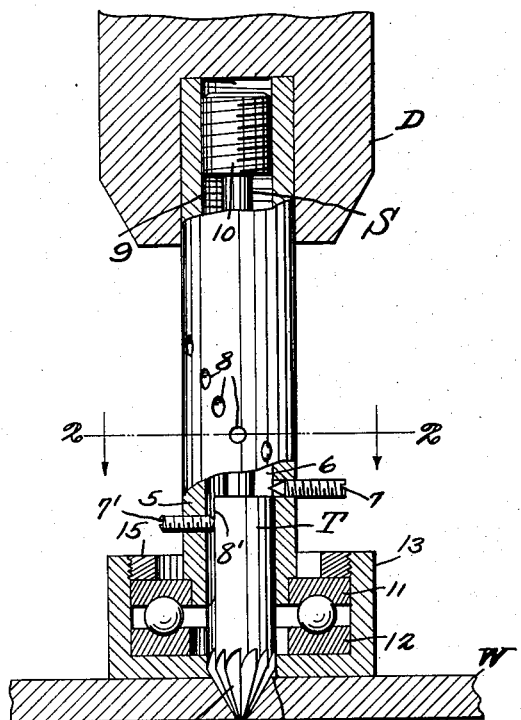
Figure 1 is a view partly in side elevation and partly in vertical section, through the device constituting the present invention, a countersinking or reaming tool being shown in position therein, and in engagement with the work.

Referring to the drawing in detail, 5 designates a tubular body portion formed with a cylindrical bore 6, the bore extending completely through the body portion. The body portion 5 constitutes the main member of a rotatable structure.

The bore 6 is proportioned to receive a reaming or countersinking tool T of the maximum size to be used, the tool T having the shank S, that is of reduced diameter relative to the remaining portion of the tool.

An adjusting screw 7 or the like is adapted to be inserted through any of a plurality of openings 8 that are formed in the wall of the body portion 5, these openings being preferably arranged spirally, and being formed at different points longitudinally of the body portion. The screw 7 is adapted to engage, at its pointed end, the shoulder formed at the intersection of the shank S and the thickened or lower portion of the tool T.

Thus, by reason of the provision of the plurality of openings 8, the tool T can be positioned adjustably relative to the body portion 5. Additionally, it may be noted that the provision of these openings 8 arranged as shown permits the use in the device of countersinking tools having the shoulder mentioned above located at different points between the ends of the countersinking tool. The screw 7 is entered through a selected opening 8 which will be nearest the shoulder of the tool T selected, whereupon by threading the screw inwardly or outwardly as desired, fine adjustment as to the depth of the recess to be countersunk can be made.

In operation, as the body portion 5 rotates, the tool T will rotate with it. For this purpose, I employ a set screw 7' threadable through an opening in the wall of the body portion 5 against the tool T. One portion of the wall of the tool T is formed with a longitudinally disposed flat portion 8' against which the screw 7' is threaded.

At its upper end, the bore 6 is threaded as at 9, to receive the screw 10, that is adapted to engage the upper end of the shank S, after the countersinking tool T has been adjustably positioned in the body portion 5 by means of the screw 7.

The lower end of the body portion 5 is tightly fitted within a stationary or bearing member, that includes a ball bearing 11 which can be of any type necessary to meet the requirements. One form of ball bearing has been illustrated, but it is to be understood that a bearing made up of concentric rings instead of superposed rings could be utilized, both forms of bearings being well known in the art.

In either case, the ball bearing 11 is mounted within a recess 12, formed in the upper face of a bearing collar 13, having a central opening 14, the diameter of which is at least equal to that of the internal diameter of the body portion 5. Where a bearing such as illustrated is employed, a retaining ring 15 can be screwed into the upper portion of the recess 12, for the purpose of holding the bearing in place. Other types of bearings could be differently held in obvious ways.

After a tool has been selected for the purpose of producing a countersink or recess of the desired proportions, the tool is adjusted longitudinally of the body portion 5 in the manner hereinbefore described, so that when a recess of the desired depth has been produced, the collar 13 will contact with the surface of the work and prevent the tool from cutting too deeply thereinto. The tool T is securely fastened to the body portion 5 by means of the screws 7 and 7', and the screw 10 is of course adjusted against the end of the shank S, so as to constitute a positive abutment for the shank. Of course, if further small adjustment is desired after the body portion 5 has been placed in the drill chuck, this can be effected without removing the body portion from the chuck, as described above.

With the parts thus adjusted and held relative to each other, the device can be used in the ordinary way for producing any desired number of countersinks, and it will be found that in every case the countersinks will be exactly duplicated. As the collar 13 does not rotate with the tool, but merely presses against the surface of the work, there is no danger of scarring the work during the cutting operation. It is possible, with this arrangement, to produce a great number of like countersinks in a short period of time, thus speeding up greatly the completion of work in which numerous countersinks are required.

Obviously, tools of different sizes less than the diameter of the bore 6 can be used in the device, it being merely essential that all of the tools have shoulders engageable by the screw 7, this being customary.

It is to be understood of course that the means for rotating the tool is to be proportioned to bodily engage and grip the body portion 5.

Figure 3:
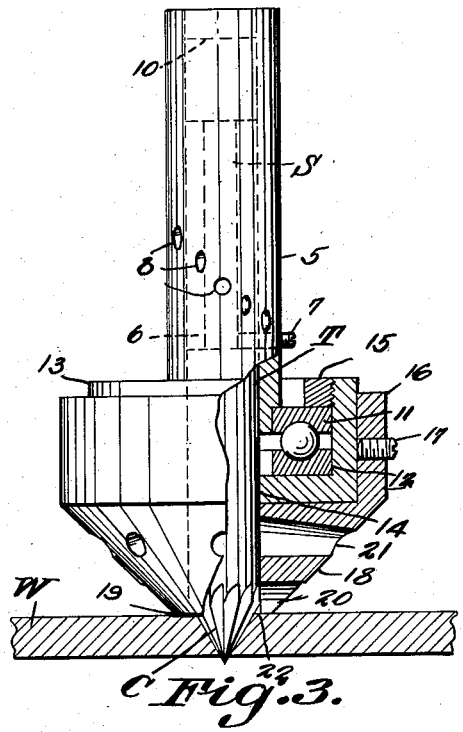
Figure 3 is a view partly in elevation and partly in section, showing a modified structure.
Figure 2:
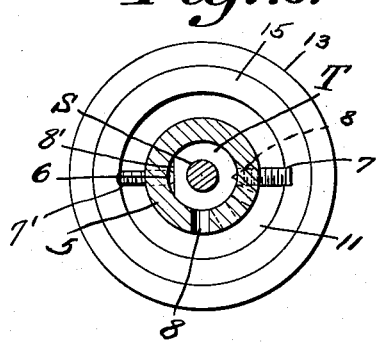
Figure 2 is a view taken on line 2—2 of Figure 1.
Figure 4:
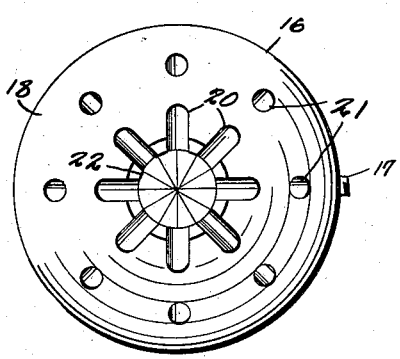
Figure 4 is a bottom view of the structure illustrated in Figure 3.

Under some conditions, it is desirable to provide a means whereby the chips produced by the reaming operation can pass freely away from the cutting tool. Under these conditions, the collar 13, instead of being brought directly against the surface of the work, is equipped with a supplemental collar 16, which as clearly shown in Figure 3, surrounds the collar 13 and can be securely held thereto in any desired manner, as by means of one or more set screws 17.

The supplemental collar 16 can be provided with a frusto-conical extension 18, or can be of any other suitable shape, and the lower end 19 thereof, which contacts with the surface of the work, can be formed with radial slots or grooves 20, constituting outlets. Supplemental outlets, in the form of openings 21, can be extended from the center opening 22 of the supplemental collar 16, outwardly to the periphery thereof.

As the cutting tool T extends through the supplemental collar 16, and has its cutting end C projecting therebeyond a distance sufficient to produce a countersink of the desired depth, it will be obvious that any chips produced by the cutting operation will be free to move outwardly away from the tool, through either or both the grooves 20 and openings 21.

In the drawing, the work engaged by the tool has been indicated at W.

What is claimed is:

The combination, with a countersink having a cutting head and a shank extending therefrom reduced in diameter relative to the head to define a shoulder spaced from the cutting end of said head, of a countersink holder including a stationary work-engaging bearing member, a rotatable body portion having one end mounted to rotate in the bearing member and the other end proportioned for gripping by a chuck, there being an end-to-end bore of constant diameter in the body portion and said bore being threaded at the second-named end of the body portion, the head being extended into and being a snug fit within the bore, a set screw threadable through the side wall of the body portion against the cutting head to hold the countersink and body portion against relative rotation, the shank being of constant diameter to define a space between the shank wall and wall of the bore extending from the shoulder to the free end of the shank, the body portion having a longitudinal series of spirally arranged openings communicating with said space, an adjusting screw threadable through any of said openings to extend into said space and having a tapered end for cam engagement with the countersink shoulder to adjust the countersink longitudinally of the body portion, and a holding screw threadable in said threaded end of the bore and against the inner end of the countersink to hold the countersink in its longitudinally adjusted position and against retrograde movement after longitudinal adjustment of the countersink relative to the body portion.

THOMAS EUGENE WRIGHT.

REFERENCES CITED

The following references are of record in the file of this patent:

UNITED STATES PATENTS

| Number | Name | Date |
| --- | --- | --- |
| 303,303 | Mansfield | Aug. 12, 1884 |
| 468,857 | William et al. | Feb. 16, 1892 |
| 1,389,390 | Sparling | Aug. 30, 1921 |
| 1,598,726 | Jaynes | Sept. 7, 1926 |
| 2,317,615 | Johnson | Apr. 27, 1943 |
| 2,359,309 | Hayes | Oct. 3, 1944 |
| 2,408,652 | King | Oct. 1, 1946 |

FOREIGN PATENTS

| Number | Country | Date |
| --- | --- | --- |
| 109,102 | Great Britain | Sept. 1, 1917 |
| 126,906 | Great Britain | May 22, 1919 |